Figure 1:
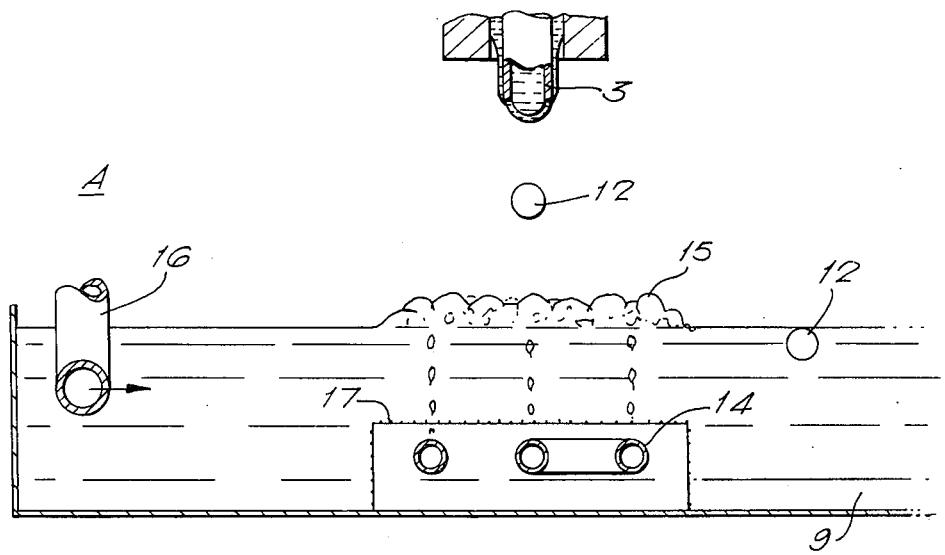
Figure 1:
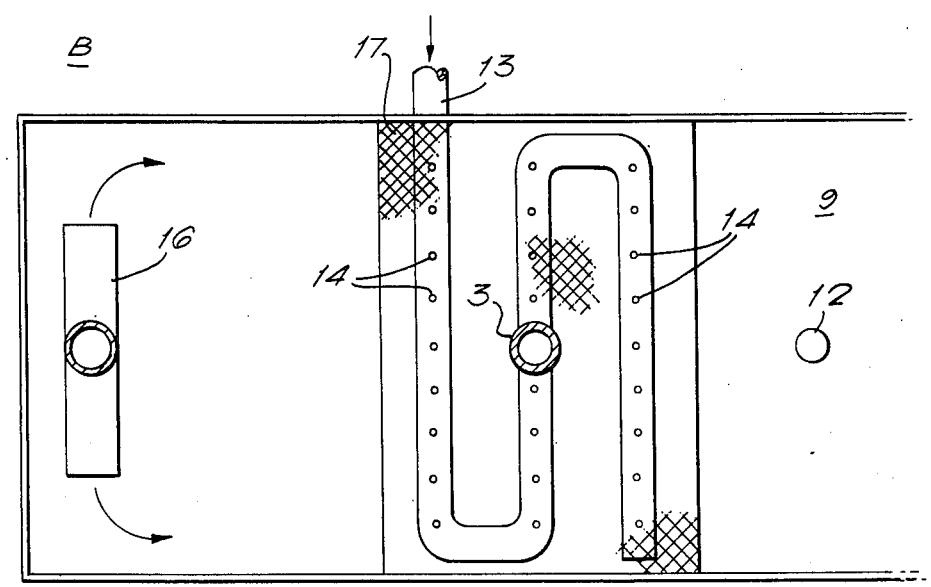

United States Patent [19]

Barwick et al.

[11] 4,119,739
[45] Oct. 10, 1978

[54] PROCESS OF PREPARING SIMULATED FRUIT

[75] Inventors: Bryan Edwin Barwick, Rushden; Michael Edwin Sneath, Wellingborough, both of England

[73] Assignee: Thomas J. Lipton, Inc., Englewood Cliffs, N.J.

[21] Appl. No.: 779,783

[22] Filed: Mar. 21, 1977

Related U.S. Application Data

[63] Continuation-in-part of Ser. No. 690,944, May 28, 1976, abandoned, which is a continuation-in-part of Ser. No. 531,377, Dec. 10, 1974, abandoned.

[51] Int. Cl.$^2$ ............................................. A23L 1/04
[52] U.S. Cl. ................................. 426/573; 426/575; 426/577; 426/803
[58] Field of Search ............... 426/573, 575, 576, 577, 426/803, 104; 264/7, 4, 1

[56] References Cited

U.S. PATENT DOCUMENTS

| 2,766,478 | 10/1956 | Rayley, Jr. et al. | 18/1 |
| 3,699,196 | 10/1972 | Joyce et al. | 264/8 |

FOREIGN PATENT DOCUMENTS 1,302,275  1/1973  United Kingdom.

Primary Examiner—Jeanette M. Hunter
Attorney, Agent, or Firm—Brumbaugh, Graves, Donohue and Raymond

[57] ABSTRACT

In a process for preparing simulated berries by co-extruding alginate or low-methoxy pectate round fruit pulp, puree or a fruit-flavored solution to give drops coated with the alginate or low-methoxy pectate, damage and inconvenient splashing as drops enter a setting bath of a solution of edible calcium salt is reduced by foaming the surface of the bath. Foaming can be achieved in a preferred form of the invention by bubbling air under the surface of the bath to ensure constant breaking of the surface of the bath.

3 Claims, 2 Drawing Figures

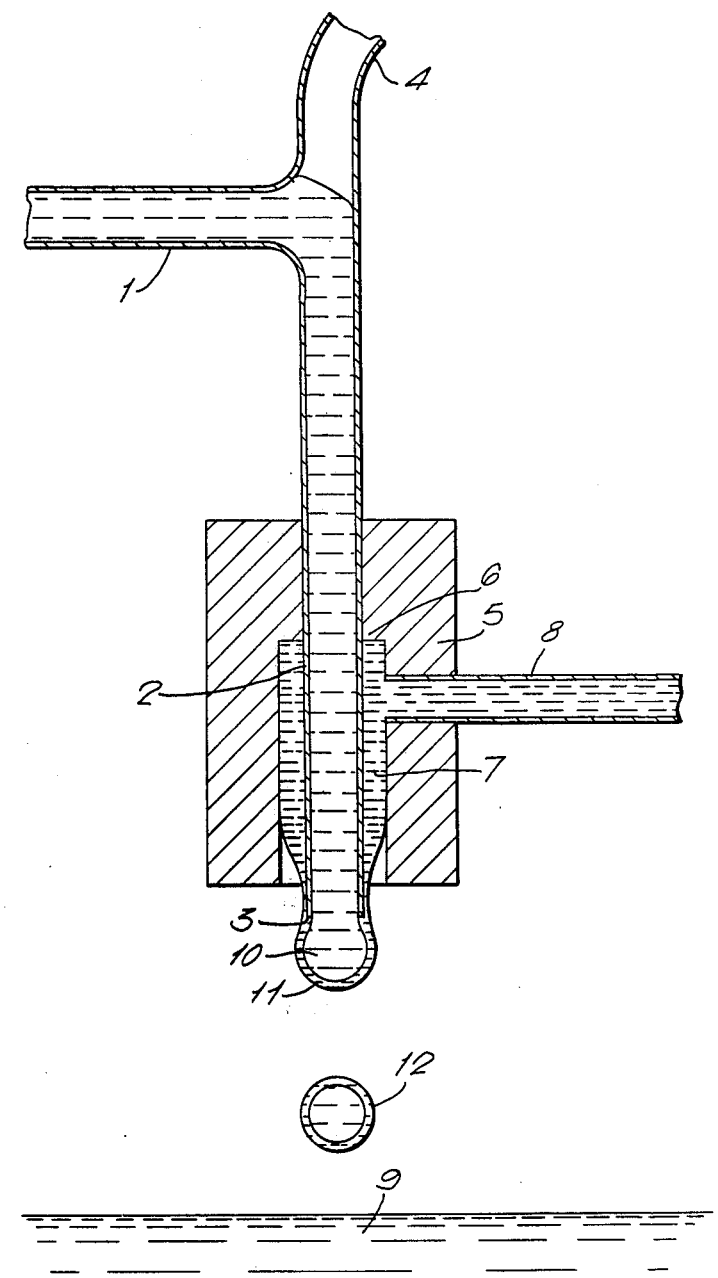

PROCESS OF PREPARING SIMULATED FRUIT

This application is a continuation-in-part of our copending application Ser. No. 690,944 filed May 28, 1976 which is a continuation-in-part of our application Ser. No. 531,377 filed Dec. 10, 1974 both now abandoned.

BACKGROUND TO INVENTION

This invention relates to a process for preparing simulated soft fruit such as blackcurrants, redcurrants, blueberries and bilberries in which a relatively tough skin surrounds a liquid or at least a substantially liquid interior. Simulated fruit are important as economic and convenient substitutes for natural fruit. Their preparation is also a useful outlet for waste products from other processes using fruit. Simulated fruit can be used in many products for instance in dairy products such as yoghurt and ice cream, in jam, in flans and in pies. It is important to have processes capable of producing simulated fruit on a large scale otherwise possible economic advantages will not be realised.

PRIOR ART

Many publications discuss the possible use of alginate or pectate gels to form simulated fruits. Examples are Peschardt U.S. Pat. No. 2,403,547 and copending Wood application Ser. No. 195,830. Young et al U.K. Pat. No. 1,302,275 and Johnson U.S. Pat. No. 3,682,654 describe methods of preparing soft fruit in which drops containing calcium ions are dropped into a bath of alginate or pectate sol. There is a tendency for the drops to stick together in the bath of alginate or pectate sol. Sneath in U.S. Pat. No. 3,922,360 and Netherlands Pat. No. 7,400,889 describes a process in which drops of fruit pulp, puree or juice are prepared coated with alginate or low-methoxy pectate sol by co-extrusion of the pulp, puree or juice with the sol and the coating is set by dropping into a setting bath comprising a solution of an edible calcium salt.

It has now been realised that in such co-extrusion processes impact of the coated drops on the setting bath causes special problems: there is a surprising likelihood that splashes of the solution of the calcium salt will hit the co-extrusion nozzle and, by causing at least incipient setting of the coating sol, interfere with proper formation of the coated drops. In addition the impact of the coated drops can distort the shape of the drops, and also distort or displace the coating.

THE INVENTION

It has now been found that these effects can be overcome or at least mitigated by foaming the surface of the setting bath. The invention therefore provides an improvement in a process for preparing simulated berry fruits in which a fruit-flavored aqueous solution or suspension preferably based on fruit pulp, puree or juice is co-extruded with an alginate or low methoxy pectate sol to give fruit-flavored drops coated with the sol and the drops are then dropped or thrown into a setting bath containing an edible, water-soluble calcium salt, the improvement consisting in the setting bath being foamed where the drops enter the bath.

The foaming should preferably be such that the surface of the liquid setting or hardening agent is raised between 2 mms and 25 mms. Foaming is to be taken to cover the situation when there is constant breaking of the surface of the liquid setting or hardening agent as well as the situation where there are bubbles of gas with an appreciable life-time. Indeed, it has further been found that a preferred method of foaming of the setting or hardening agent is by blowing air into the liquid or hardening agent so that bubbles of air are constantly breaking at the surface. Any gas can be used that is non-reactive to the materials used in the process. Air will often be most convenient.

Particularly preferably the foaming raises the surface of the liquid setting or hardening agent between 2 mms and 10 mms.

The invention is, as stated above, particularly applicable to the processes described in Sneath U.S. Pat. No. 3,922,360 and corresponding Netherlands Pat. No. 7,400,889 and for further details reference can be made to these specifications, in particular to the specification of Netherlands Pat. No. 7,400,889. In such a process the co-extrusion nozzle is preferably 2–30 cms above the surface of the liquid setting or hardening agent and, as stated in the Netherlands specification, it is particularly preferably 5–20 cms above the liquid setting or hardening agent (i.e. from the top of the foamed/turbulent surface).

It is particularly important that the present process alleviates problems of distortion and splashing on impact so successfully when a number of co-extrusion nozzles are used, for example, in a head containing a number of nozzles. The present process has the advantage of simplicity but with a number of nozzles also eliminates the problem reliably.

Preferred calcium salts for use in the setting bath are calcium lactate, citrate, gluconate and acetate. The fruit-flavored aqueous solution or suspension can but not necessarily, contain such a water-soluble, edible calcium salt. As indicated in Sneath U.S. Pat. No. 3,922,360 preferred concentrations of dissolved edible, soluble calcium ions in the fruit-flavored solution or suspension are from those provided by about 0.1 to about 0.2% of calcium lactate. Preferably the concentration of calcium ions provided by the water-soluble, edible calcium salt in the setting bath is that provided by 1–10%, by weight, particularly 4–7%, of calcium lactate. For details of preferred such processes reference should be made to Sneath Netherlands Pat. No. 7,400,889 and U.S. Pat. No. 3,922,360.

The accompanying drawings are:

FIG. 1 a diagram of a preferred form of apparatus suitable for preparing products by a process according to the invention. (A) is a schematic side-view and (B) is a schematic plan of the apparatus.

FIG. 2 is a side-view section of the extruder. A detailed process using the apparatus is described below and is illustrated by the example.

A supply pipe 1 leads from a reservoir (not shown) for the liquid to be encapsulated and is connectd to a tube 2 terminating in a nozzle outlet 3. An air line 4 from a pulse inducer is also connected to the tube 2. The tube 2 is surrounded by a jacket 5 whose upper end 6 fits tightly around the tube. A chamber 7 is thus defined between the tube 2 and the jacket 5. A pipe 8 connected to a supply of alginate sol (not shown) passes through the jacket 5 and leads into the chamber 7. The nozzle outlet 3 of the tube 2 is situated somewhat below the bottom of the jacket 5. The tube and jacket are positioned above a bath 9 containing a dissolved calcium or aluminium salt.

The nozzle outlet 3 is placed preferably 20–300 mm above the surface of the bath. The tube 2 is preferably held firmly and centrally within the chamber 7 so that a uniform layer of the sol can be extruded. One method of holding the tube centrally is by, in cross-section, point contact at at least three points near the extrusion head between the block 6 and the tube 2. From a source (not shown) a compressed non-reactive gas can be delivered to the tube 13 and can be released through a series of fine holes 14 preferably 0.01-2.0 mm in diameter. The distance to the surface of the bath is preferably from 20 mm to 150 mm.

In use for instance fruit material containing dissolved calcium ions is pumped smoothly through the supply pipe 1 to the tube 2. A pulsating air pressure is supplied to the tube 2 via air line 4. This pulsating effect is not essential for the carrying out of the invention, but it enables the more rapid formation and extrusion of drops at the nozzle outlet 3. An alginate or a pectate sol is supplied to the chamber 7 through the pipe 8. As each drop 10 of fruit material forms at the outlet 3 it becomes enveloped in a coating 11 of sol. When the fruit material contains calcium ions gelation commences at the interface of the fruit material and the coating thereby forms a calcium alginate or pectate membrane which helps to hold the drop in shape. As the drop is expelled from the nozzle outlet 3 the coating 11 envelopes the drop completely to form an intermediate product 12 which has a core of fruit material and a sticky exterior of sol. This intermediate product 12 drops into the bath containing the solution containing dissolved calcium salt 9 where gelation by the calcium ions in the bath commences. Problems occurring on entry of the drops 12 into the bath 9 are substantially reduced by releasing non-reactive gas beneath the surface of the bath 9. Bubbles of the gas rise to the surface forming a foam 15 raising the effective surface of the setting bath preferably by 2 mm to 25 mm. The drops 12 fall into the foam 15 and preferably are light enough to float in the setting bath 9. The setting bath is circulated through a T-shaped inlet pipe 16 moving the floating drops away from the foamed area. A wire mesh 17 is preferably used; it keeps the drops away from the foam-forming tubes 14.

The tube 2 preferably has a diameter of 3-10 mm and the width of the annular gap between tube 2 and jacket 5 is preferably 1-3 mm. The skin formed on the product will usually be about 1 mm thick. The sol tends to coat the tube 2 around the outlet 3 and unless it is supplied to the chamber 7 under high pressure the skin is generally thinner than the annular width of chamber 7.

The invention is illustrated by the following example.

EXAMPLE

A blackcurrant pulp mix containing calcium ions was prepared by mixing together the following ingredients:

|  | % by weight |
|---|---|
| Blackcurrant pulp | 41.1 |
| Water | 42.8 |
| Calcium lactate | 1.0 |
| Citric acid | 0.2 |
| Sugar | 12.7 |
| Cross linked farina | 1.7 |
| Carboxymethyl cellulose | 0.5 |

An alginate sol containing 2% by weight of sodium alginate was separately prepared.

The above ingredients were fed to the apparatus illustrated in the drawings. The blackcurrant pulp mix was pumped along supply line 1 at a rate of 3 kg per hour and the alginate sol was pumped along supply line 8 at 1 kg per hour. The pneumatic pulsator attached to air line 4 was set to operate at 160 pulses per minute. The apparatus used had a tube 2 with an extrusion outlet 3 of 5 mm diameter and a jacket 5 with an inner diameter of 9 mm (corresponding to an annular width for the chamber 7 of 2 mm).

Drops of blackcurrant pulp coated with alginate sol were extruded from the outlet 3 at a rate of 160 per minute and fell 10 cm into a setting bath containing:

|  | % |
|---|---|
| Calcium lactate | 6.0 |
| Sugar | 22.0 |
| Malic acid | 0.5 |
| Water | 71.5 |
|  | 100.0 |

The setting bath was foamed by compressed air pumped beneath the surface of the setting bath. The drops were in the bath 9 for 5 minutes after which time the exterior was firm and had lost the stickiness characteristic of an alginate sol and could be easily handled without breaking. Flavoured simulated blackcurrants were obtained in high and consistent yield.

What is claimed is:

1. In a process for preparing simulated fruit berries consisting essentially of
    (A) co-extruding
        (a) an aqueous sol selected from the group consisting of aqueous alginate sol and aqueous low-methoxy pectin sol, and
        (b) a fruit-flavored aqueous system selected from the group consisting of fruit-flavored solutions, fruit juice, fruit pulp and fruit puree to form fruit-flavored drops coated with the sol; and
    (B) dropping the coated drops from 2 to 30 cms into an aqueous setting bath containing as setting agent an edible, water-soluble calcium salt to set the sol to a gel selected from the group consisting of calcium alginate and low-methoxy pectate gel and thereby form simulated fruit consisting essentially of drops of a fruit-flavored aqueous system coated with said gel;
    the improvement, whereby distortion of the drops on entering the setting bath and disruptive splashing of the bath are minimised, consisting essentially in bubbling a gas non-reactive to the setting bath, the sol and the fruit-flavored system through the setting bath to form a foam at the surface of the setting bath, the height of the foam being in the range 2 to 25 millimeters.

2. A process according to claim 1 in which the concentration of calcium ions provided by the water-soluble, edible calcium salt in the setting bath is that provided by 1-10% of calcium lactate.

3. A process according to claim 1 in which the fruit-flavored aqueous system contains a dissolved edible calcium salt, the concentration of calcium ions being that provided by about 0.1 to about 0.2% of calcium lactate.

* * * * *